United States Patent [19]

Sunderman et al.

[11] Patent Number: 5,715,306
[45] Date of Patent: Feb. 3, 1998

[54] AUTOMATIC CALL DISTRIBUTION SYSTEM WITH USER DEFINABLE LOGGING AND METHOD THEREFOR

[75] Inventors: Kurt E. Sunderman, Geneva; Mark J. Michelson, Elburn; John P. Lenihan, Wheaton, all of Ill.

[73] Assignee: Rockwell International Corporation, Seal Beach, Calif.

[21] Appl. No.: 311,636

[22] Filed: Sep. 23, 1994

[51] Int. Cl.[6] .......................... H04M 3/00; H04M 15/00
[52] U.S. Cl. .................. 379/265; 379/113; 379/266; 379/309
[58] Field of Search ..................... 379/111, 112, 379/113, 114, 115, 116, 265, 266, 309, 214

[56] References Cited

U.S. PATENT DOCUMENTS

| | | | |
|---|---|---|---|
| 4,788,718 | 11/1988 | McNabb et al. | 379/266 X |
| 4,893,325 | 1/1990 | Pankonen et al. | 379/265 X |
| 5,109,399 | 4/1992 | Thompson | 379/265 X |
| 5,140,611 | 8/1992 | Jones et al. | 375/219 |
| 5,249,223 | 9/1993 | Vanacore | 379/309 X |
| 5,271,058 | 12/1993 | Andrews et al. | 379/210 |
| 5,400,327 | 3/1995 | Dezonno | 370/271 |

FOREIGN PATENT DOCUMENTS

| | | | |
|---|---|---|---|
| 0 429 770 A2 | 6/1991 | European Pat. Off. | 379/265 |
| WO 94/09585 | 4/1994 | WIPO | 379/265 |

Primary Examiner—Harry S. Hong
Attorney, Agent, or Firm—Welsh & Katz, Ltd.

[57] ABSTRACT

An automatic call distribution system (100) and method provides an operator the capability of selectively adding additional data elements for which the system (100) logs operating data. The system (100) includes an automatic call distributor (102) having a multiport switch (114) for routing incoming telephone calls to a plurality of agent telephonic units (107) and a central processing unit (116) for controlling operation of the multiport switch (114) and for acquiring data representative of specified points during the routing of calls in the system (100). An operator adds additional data elements for which the central processing unit (116) collects data via a computer terminal (120). The computer terminal (120) includes a terminal display unit (122) for displaying the data and a terminal input device (124) for sending instructions to the central processing unit (116) to add data elements. A data computer (108) connected to the central processing unit (116) stores and displays the acquired data. A printer (112) provides a printed record of the data.

17 Claims, 3 Drawing Sheets

5,715,306

AUTOMATIC CALL DISTRIBUTION SYSTEM WITH USER DEFINABLE LOGGING AND METHOD THEREFOR

BACKGROUND OF THE INVENTION

The present invention relates generally to an automatic call distribution system and, more particularly, to an automatic call distribution system and method wherein the user has the ability to define and modify the logging of operating data of the ACD system.

Automatic call distribution (ACD) systems are increasingly used by businesses to automatically route incoming customer calls to available agents. ACD systems generally include a multiport switch controlled by a central processing unit to interconnect external telephonic units of an external telephonic network with internal telephonic units. An example of such an ACD system is disclosed in U.S. Pat. No. 5,140,611 issued to Jones et al. on Aug. 18, 1992, entitled "Pulse Modulated Self-Clocking and Self-Synchronizing Data Transmission and Method for a Telephonic Communication Switching System".

ACD systems provide for acquiring, processing and reporting information concerning different aspects of activity within the system. Typically, a data display terminal generates visual representations of the information. Based on this information, management and supervisory personnel are able to evaluate the call activity within the automatic call distributor and, if necessary, make changes for more efficient ACD system operation.

Data is collected on each incoming call offered to the ACD system. This data consists of a log of events occurring in the ACD system over time for an incoming call. Typical logged data elements are receipt of call, call offered to an application, call presented to an agent group and call handled or abandoned. The data representing these data elements is then processed to generate reports for use by management or supervisory personnel. The data may be organized in any number of ways, such as by agent, telephone trunk, agent groups and the like.

In these prior ACD systems, the manufacturer of the ACD system preselects the logged data elements. The user of the ACD system is thereafter unable to add additional logged data elements. This is unfortunate since the user may desire to add one or more data elements for certain situations unique to their configuration. For example, in most ACD systems, an incoming telephone call is not considered "handled" until the call is actually connected to an agent. In some circumstances, however, a user may want to consider a call "handled" when the caller has heard a key announcement, such as a "center closed" announcement, or has left a voice mail message. With prior ACD systems, these instances would not be reported as "handled" calls.

It is thus apparent that a need exists for an automatic call distribution system and method wherein the user is able to add data elements for which data is logged.

SUMMARY OF THE INVENTION

This need is met by the automatic call distribution system and method of the present invention wherein an operator has the capability of adding one or more data elements for which data is acquired.

In accordance with one aspect of the present invention, an automatic call distribution system for routing incoming telephone calls from external callers to a plurality of agents comprises an automatic call distributor for interconnecting the incoming telephone calls to the agents and for acquiring data at specified points during each of the incoming telephone calls. An operator of the system selectively adds data elements for which the automatic call distributor acquires data through a computer terminal. The collected data may be stored and displayed on a display unit of a data computer. In addition, the data may be displayed on a terminal display unit at the computer terminal. A printout of the data may also be obtained from a printer connected to the data computer.

In accordance with another aspect of the present invention, an automatic call distribution system is provided for routing incoming telephone calls. The automatic call distribution system comprises a plurality of agent groups each of which is comprised of at least one agent for receiving the incoming telephone calls and a multiport switch for interconnecting the incoming telephone calls and the agent groups. A central processing unit controls the multiport switch to connect each of the incoming telephone calls to a selected one of the agent groups and acquires data at specified points during each of the incoming telephone calls. An operator of the system selectively adds data elements for which the central processing unit acquires data by means of a computer terminal. A data computer connected to the central processing unit includes a data display unit for displaying at least a portion of the data and a data input device for selectively formatting the data for display on the data display unit.

In accordance with yet another aspect of the present invention, a method for procuring data in an automatic call distribution system is provided. The method comprising the steps of: receiving a plurality of incoming telephone calls from external callers at the automatic call distribution system, the automatic call distribution system including a multiport switch; routing the plurality of incoming telephone calls through the multiport switch to a plurality of agents; selectively defining data elements which may occur during the routing of each of the incoming telephone calls in the automatic call distribution system; and acquiring data associated with the selectively defined data elements for each of the incoming telephone calls.

These and other features and advantages of the present invention will become apparent from the following detailed description, the accompanying drawings and the appended claims.

DETAILED DESCRIPTION OF THE INVENTION

Figure 1:
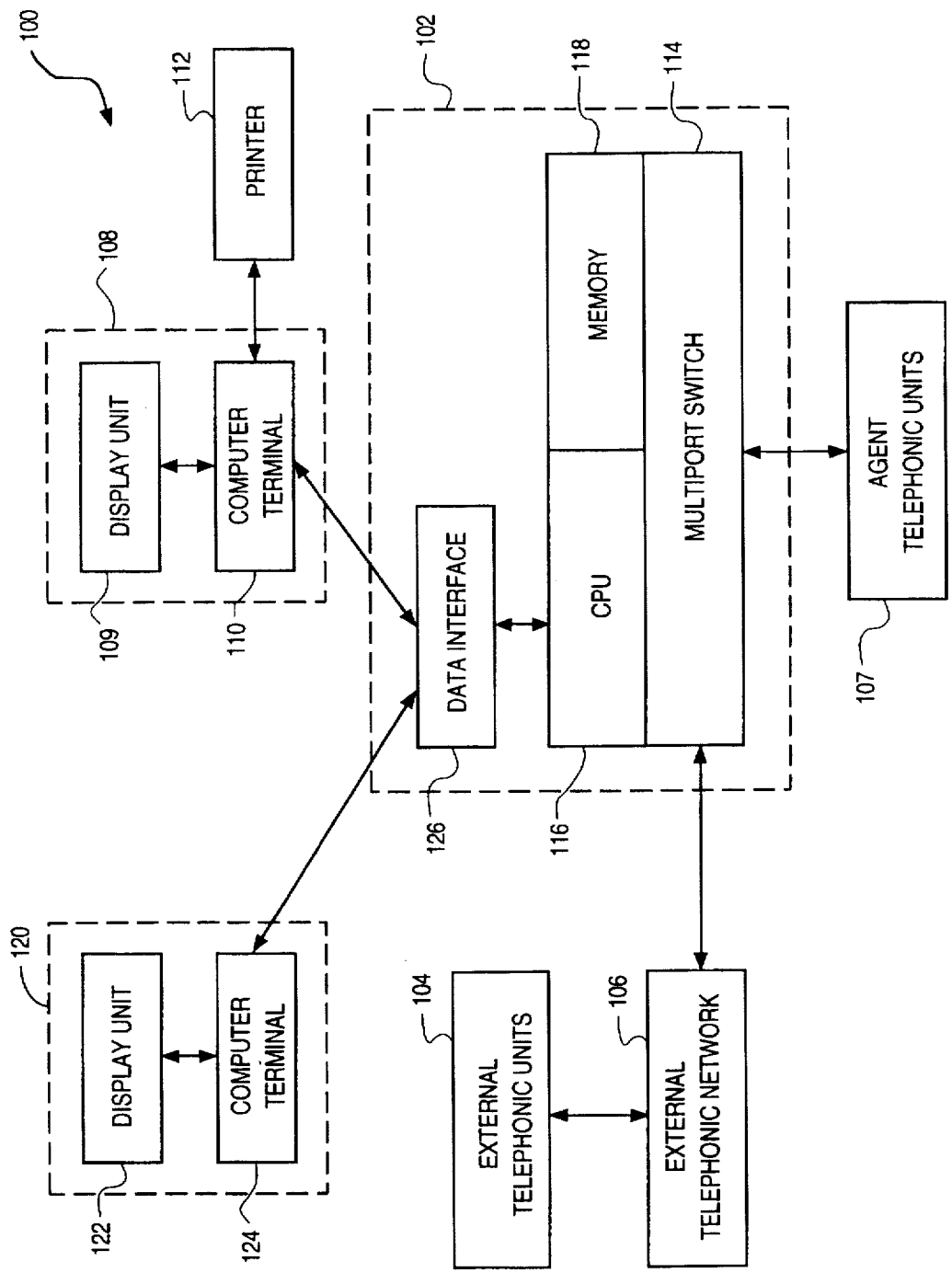
FIG. 1 is a schematic block diagram of an exemplary automatic call distribution system connected to external telephonic units via an external telephonic network in accordance with the present invention.

An automatic call distribution (ACD) system 100 in accordance with the present invention comprises an automatic call distributor 102 for routing incoming telephone calls received from external telephonic units 104 via an external telephonic network 106 to a plurality of agent telephonic units 107. As will be readily apparent to those skilled in the art, the automatic call distributor 102 may be any of a number of different call switching systems, or devices.

The automatic call distributor 102 is connected to a data computer 108 comprising a data display unit 109, such as a conventional CRT, coupled to a data input device 110. The data computer 108 stores the data acquired by the automatic call distributor 102, selectively formats the data and displays the data received from the automatic call distributor 102 on the data display unit. The data input device 110 may comprise a conventional keyboard and a microprocessor-based computer circuit. A conventional printer 112 connected to the data computer 108 generates printed records of data received from the automatic call distributor 102.

Specifically, the automatic call distributor 102 has a multiport switch 114 for routing incoming telephone calls to selected ones of the agent telephonic units 107. The multiport switch 114 is controlled by a central processing unit (CPU) 116, or a suitable computer, having a memory 118 for processing data related to incoming telephone calls. The CPU 116 is appropriately programmed to route incoming telephone calls through the ACD system 100. Preferably, the processing power of the CPU 116 is provided by a 32 bit Motorola 68030 microprocessor.

An operator of the ACD system 100 adds additional data elements for which the CPU 116 collects data through one or more computer terminals 120. The computer terminal 120 includes a conventional terminal display unit 122, such as a CRT, and a terminal input device 124. To add additional data elements, the operator modifies the computer program implemented by the CPU 116 via the terminal input device 124, as discussed more fully below. It should be understood that the operator can also access the data stored in the data computer through the computer terminal 120.

A data interface 126 provides communications between the CPU 116, the data computer 108 and the computer terminal 120. As will be readily apparent, the structure and philosophy of the components of the ACD system 100 are well known in the art and will not be further discussed herein. Further, other configurations of the automatic call distributor 102 can be advantageously employed in the present invention.

Figure 2:
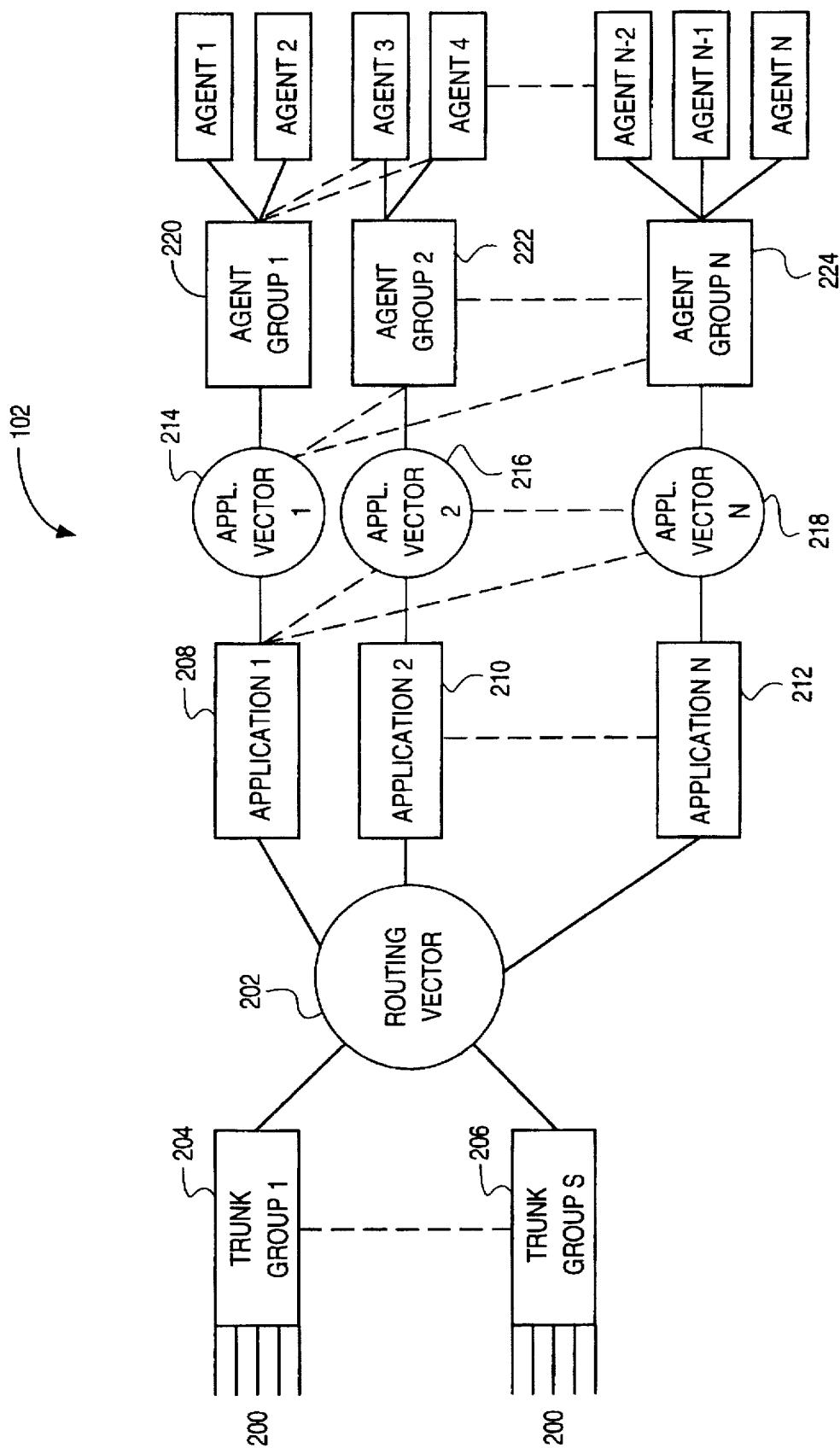
FIG. 2 is a schematic block diagram of an exemplary routing scheme which may be implemented in the automatic call distribution system shown in FIG. 1.

A block diagram illustrating an exemplary routing scheme in the automatic call distributor 102 is shown in FIG. 2. Incoming telephone calls are received from the external telephonic network 106 over telephone trunks 200 which are grouped into trunk groups 1-S 204 and 206. A routing vector 202, or telescript, receives incoming telephone calls from the trunk groups 204 and 206. Based on user supplied statements, the routing vector 202 routes each of the external telephone calls to a selected one of applications 1-N 208, 210 and 212. The applications 208, 210 and 212 then direct each of the calls to one of the user defined application vectors 1-N 214, 216 and 218.

For purposes of the present invention, a vector is one or more user defined statements or instructions in a computer program stored in the memory 118 and executed by the CPU 116 for routing incoming telephone calls. Application vectors 214, 216 and 218 route the calls from the applications 208, 210 and 212 to one or more of agent groups 1-N 220, 222 and 224 for handling by agents 1 through N. As is well known in the art, the call may be routed based on information supplied by the external telephonic network 106, such as a Dialed Number Identification Service which identifies the called number, or an Automatic Number Identification. The mechanisms for routing calls in an ACD system are well known in the art and will therefore not be further discussed herein.

Figure 3:
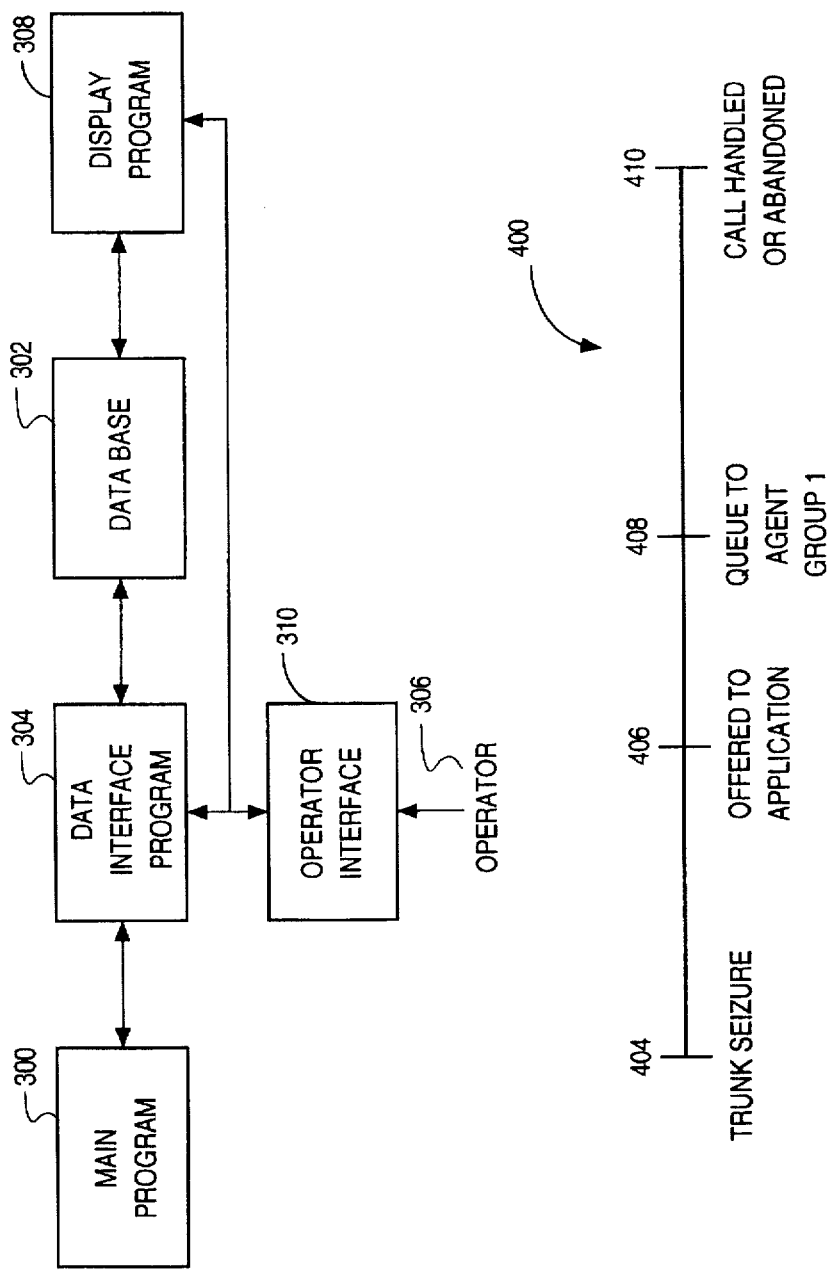
FIG. 3 is a block diagram showing the interrelationship between various computer programs in the automatic call distribution system shown in FIG. 1.

The relationship between the computer programs executed by the ACD system 100 to record data at specified points during the routing of each of the incoming telephone calls to provide an indication of the operation of the ACD system 100 is shown in FIG. 3. A main program 300, which is typically implemented in the C programming language, acquires information, or data, relating to specific events occurring in the automatic call distributor 102 for each incoming telephone call. A data element may be a count of call offered to an application, call offered to an agent group, call handled or abandoned and the like. In current telephone switching systems, the operator is unable to add additional data elements for which the main program 300 collects data. The present invention provides an operator with the flexibility to add data elements for which the main program 300 collects data.

At periodic intervals, the main program 300 downloads collected data to a database 302. A data interface program 304 formats data transferred between the main program 300 and the database 302. The operator 306 can organize and format the data via a display program 308 for display either on the terminal display unit 122 or the data display unit 109.

Instructions from the operator 306 are provided to the display program 308 through an operator interface 310. With the present invention, the operator 306 has the capability to add data elements for which the CPU 116 obtains information. The operator 306 adds data elements by modifying the main program 300 via the computer terminal 120.

Figure 4:
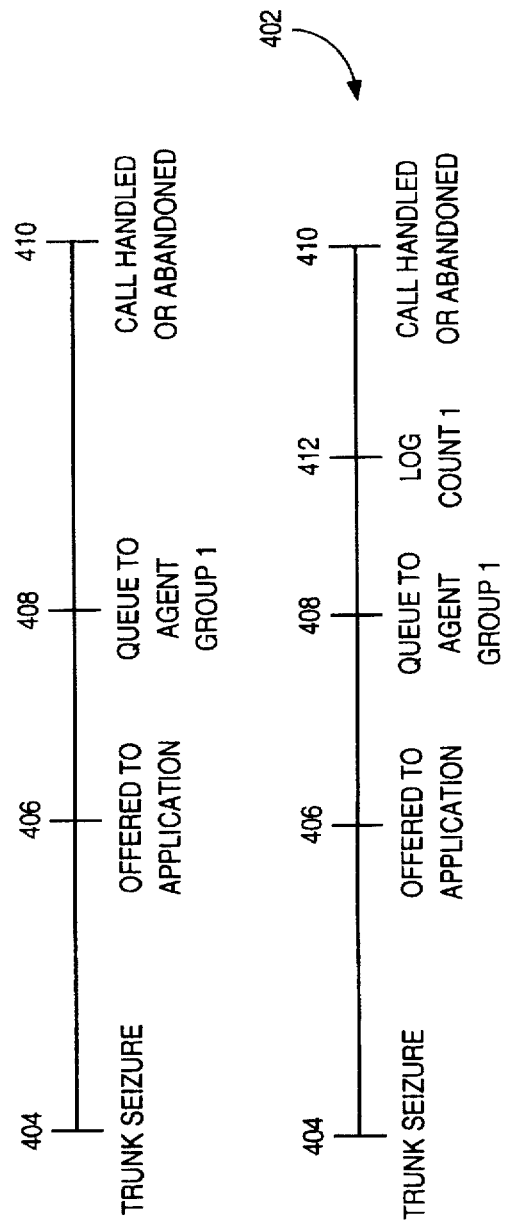
FIG. 4 is a pair of timelines illustrating exemplary data elements which may be logged during routing of an incoming telephone call in the automatic call distribution system shown in FIG. 1.

A pair of exemplary timelines 400 and 402 showing data elements for incoming telephone calls are shown in FIG. 4. In timelines 400 and 402, common data elements (trunk seizure 404, offered to the application 406, queued to agent group 1 408 and call handled or abandoned 410) are recorded for each incoming telephone call. An application vector, or telescript, which is stored in the memory 118 and executed by the CPU 116, for a portion of the timeline 400 is set forth below.

| | |
|---|---|
| 10 | START TONE RINGBACK |
| 20 | QUEUE AGENT GROUP 1 |
| 30 | DELAY 5 SECONDS |
| 40 | PLAY ANNOUNCEMENT 25 |
| 50 | DELAY 20 SECONDS |
| 60 | PLAY ANNOUNCEMENT 26 |
| 70 | GOTO 50 |

In accordance with the above vector, an incoming telephone call is queued to agent group 1. The CPU 116 detects that the telephone call has been queued to agent group 1 and generates data representative thereof. After a 5 second delay, if an agent does not answer the call, an announcement 25 is played to the caller. After a further delay of 20 seconds, an announcement 26 is played to the caller. If the caller then abandons the call, the CPU 116 generates data indicating that the call has been abandoned. After a predetermined time, this "abandoned" data is then transmitted to and stored in the data computer 108.

Unfortunately, the operator 306 of the system 100 may want to determine how many of the callers actually heard the announcement 25. With the above vector, however, the operator 306 cannot obtain this information. Callers who abandoned the call before hearing the announcement 25, callers who heard only the announcement 25 and callers who heard both the announcement 25 and the announcement 26 are all considered "abandoned" and thereby rendered indistinguishable from one another.

In the present invention, the operator 306 is able to obtain this information by adding data elements for which the CPU 116 obtains data. For example, the timeline 402 illustrates modification of the above vector to record which callers actually heard the announcement 25. An exemplary vector for a portion of the timeline 402 is set forth below.

| | |
|---|---|
| 10 | START TONE RINGBACK |
| 20 | QUEUE AGENT GROUP 1 |
| 30 | DELAY 5 SECONDS |
| 40 | PLAY ANNOUNCEMENT 25 |
| 45 | LOG count1 |
| 50 | DELAY 20 SECONDS |
| 60 | PLAY ANNOUNCEMENT 26 |
| 70 | GOTO 50 |

As is apparent, line 45 has been added to the vector by the operator 306 by means of the computer terminal 120 in accordance with the present invention so that the CPU 116 will obtain data representative of callers who hear the announcement 25. An incoming telephone call is queued to the agent group 1 which is detected and recorded by the CPU 116. If an agent does not handle the call after a 5 second delay, the announcement 25 is played to the caller. After playing the announcement 25, the CPU 116 increments the variable count1 to indicate that the caller heard the announcement 25. The data relating to the variable count1 is then stored in the database 302 for later retrieval by the operator 306. The operator 306 is thereby able to determine how many callers heard the announcement 25. It should be understood that the present invention may be advantageously employed to provide a record of any number of data elements which may occur during routing of a telephone call in the ACD system 100.

For example, callers who receive a "center closed" announcement after hours are typically logged as "abandoned" since they were never connected to an agent. Similarly, callers who have recorded a voice mail message for later call back are typically logged as "abandoned". In both instances, an operator may want those calls to be logged as "handled". This is readily accomplished in the present invention by modification of the appropriate vector via the computer terminal 120 and then adding these new counts to the equation for "calls handled" used when formatting and printing reports.

Having thus described the invention in detail by way of reference to preferred embodiments thereof, it will be apparent that other modifications and variations are possible without departing from the scope of the invention defined in the appended claims. For example, the automatic call distributor 102 may have design configurations which depart from those described herein.

What is claimed is:

1. An automatic call distribution system for routing incoming telephone calls from external callers to a plurality of agents comprising:

an automatic call distributor for interconnecting the incoming telephone calls to the agents and for collecting data corresponding to specified data elements during each of the incoming telephone calls; and a computer terminal connected to the automatic call distributor for selectively adding and defining data elements for which the automatic call distributor acquires data, the data elements relating to operation of the automatic call distributor during routing of the incoming telephone calls to the agents.

2. The automatic call distribution system as recited in claim 1 wherein the automatic call distributor comprises a multiport switch for interconnecting the incoming telephone calls and the agents.

3. The automatic call distribution system as recited in claim 2 wherein the automatic call distributor comprises a central processing unit for controlling the multiport switch to connect each of the incoming telephone calls to a selected one of the agents and for acquiring data at the specific points during each of the incoming telephone calls.

4. The automatic call distribution system as recited in claim 1 wherein the computer terminal includes a terminal display unit connected to the automatic call distributor for displaying at least a portion of the data acquired by a central processing unit of the automatic call distributor.

5. The automatic call distribution system as recited in claim 1 including a data computer connected to a central processing unit of the automatic call distributor for storing the data acquired by the central processing unit, for selectively formatting the data and for displaying the data.

6. The automatic call distribution system as recited in claim 5 comprising printer means connected to the data computer for generating a printed record of at least a portion of the data.

7. The automatic call distribution system as recited in claim 5 wherein the automatic call distributor comprises a data interface for providing communications between the data computer, the computer terminal and the automatic call distributor.

8. The automatic call distribution system as recited in claim 1 wherein the computer terminal comprises:

a terminal display unit for displaying at least a portion of the data; and a terminal input device for sending information to the automatic call distributor selectively adding data elements for which the automatic call distributor acquires data.

9. An automatic call distribution system for routing incoming telephone calls comprising:

a plurality of agent groups each of which is comprised of at least one agent for receiving the incoming telephone calls;

a multiport switch for interconnecting the incoming telephone calls and the agent groups;

a central processing unit for controlling the multiport switch to connect each of the incoming telephone calls to a selected one of the agent groups and for acquiring data at specified points during each of the incoming telephone calls; and a computer terminal connected to the central processing unit for selectively defining data elements for which the central processing unit acquires data, the computer terminal including, a terminal display unit for displaying at least a portion of the data, and a terminal input device for sending instructions to the central processing unit selectively adding data elements for which the central processing unit acquires data, the data elements relating to operation of the automatic call distributor during routing of the incoming telephone calls to the agents.

10. The automatic call distribution system as recited in claim 9 comprising a data computer for storing the data acquired by the central processing unit, for selectively formatting the data and for displaying the data.

11. The automatic call distribution system as recited in claim 10 comprising printer means connected to the data computer for generating a printed record of at least a portion of the data.

12. The automatic call distribution system as recited in claim 10 comprising a data interface interposed between the data computer, the computer terminal and the central processing unit for providing communications therebetween.

13. A method for procuring data in an automatic call distribution system comprising the steps of:

receiving a plurality of incoming telephone calls from external callers at the automatic call distribution system, the automatic call distribution system including a multiport switch;

routing the plurality of incoming telephone calls through the multiport switch to a plurality of agents;

selectively defining at least one data element at specified points which may occur during the routing of each of the incoming telephone calls in the automatic call distribution system, the data elements relating to operation of the automatic call distributor during routing of the incoming telephone calls to the agents; and acquiring data associated with the at least one data element for the incoming telephone calls.

14. The method as recited in claim 13 comprising the step of displaying the data.

15. The method as recited in claim 14 wherein the step of displaying the data comprises the step of printing a record of the data.

16. The method as recited in claim 14 wherein the step of displaying the data comprises the step of providing a visual representation of the data.

17. The method as recited in claim 16 wherein the step of displaying the data comprises the steps of:

storing the data in at least one database; and selectively displaying data from the at least one database.

* * * * *